US008161393B2

(12) United States Patent  
Gillingham et al.

(10) Patent No.: US 8,161,393 B2
(45) Date of Patent: Apr. 17, 2012

(54) ARRANGEMENTS FOR MANAGING PROCESSING COMPONENTS USING A GRAPHICAL USER INTERFACE

(75) Inventors: Marlene J. Gillingham, Bellevue, WA (US); Karen A. Taylor, Carnation, WA (US); Steven J. Zaharias, Issaquah, WA (US)

(73) Assignee: International Business Machines Corporation, Armonk, NY (US)

( * ) Notice: Subject to any disclaimer, the term of this patent is extended or adjusted under 35 U.S.C. 154(b) by 746 days.

(21) Appl. No.: 11/856,809

(22) Filed: Sep. 18, 2007

(65) Prior Publication Data

US 2009/0077478 A1    Mar. 19, 2009

(51) Int. Cl.
G06F 3/00 (2006.01)
H04L 12/28 (2006.01)

(52) U.S. Cl. .................. 715/736; 715/734; 370/254

(58) Field of Classification Search .......... 715/734, 715/735, 736, 705, 708; 370/254, 255, 256
See application file for complete search history.

(56) References Cited

U.S. PATENT DOCUMENTS

| | | | |
|---|---|---|---|
| 5,185,860 A * | 2/1993 | Wu | 709/224 |
| 5,457,797 A | 10/1995 | Butterworth et al. | |
| 5,522,075 A | 5/1996 | Robinson et al. | |
| 5,640,546 A | 6/1997 | Gopinath et al. | |
| 5,732,086 A * | 3/1998 | Liang et al. | 370/410 |
| 5,926,101 A | 7/1999 | Dasgupta | |
| 6,049,861 A | 4/2000 | Bird et al. | |
| 6,263,387 B1 | 7/2001 | Chrabaszcz | |
| 6,330,653 B1 | 12/2001 | Murray et al. | |
| 6,597,956 B1 | 7/2003 | Aziz et al. | |
| 6,625,274 B1 | 9/2003 | Hoffpauir et al. | |
| 6,654,747 B1 | 11/2003 | Van Huben et al. | |
| 6,895,443 B2 * | 5/2005 | Aiken | 709/245 |
| 6,976,068 B2 | 12/2005 | Kadam et al. | |
| 7,191,327 B2 | 3/2007 | Viljoen et al. | |
| 7,310,774 B1 * | 12/2007 | Arquie et al. | 715/734 |
| 7,640,503 B1 * | 12/2009 | Jacquot et al. | 715/735 |
| 2002/0038360 A1 | 3/2002 | Andrews et al. | |
| 2003/0018870 A1 | 1/2003 | Abboud et al. | |
| 2004/0073663 A1 * | 4/2004 | Scarth | 709/224 |
| 2004/0264422 A1 | 12/2004 | Calcev et al. | |
| 2005/0038808 A1 * | 2/2005 | Kutch | 707/102 |
| 2005/0081084 A1 | 4/2005 | Lai et al. | |
| 2005/0091396 A1 | 4/2005 | Nilakantan et al. | |
| 2005/0120030 A1 | 6/2005 | Varpela et al. | |
| 2005/0229173 A1 | 10/2005 | Mihm et al. | |
| 2006/0010133 A1 * | 1/2006 | Bozek et al. | 707/10 |
| 2006/0251072 A1 | 11/2006 | Hendel et al. | |
| 2007/0067435 A1 | 3/2007 | Landis et al. | |

OTHER PUBLICATIONS

Neeraj K Utreja, U.S. Appl. No. 11/847,568.
Wei Zhao, U.S. Appl. No. 11/856,827.

* cited by examiner

*Primary Examiner* — Tadeese Hailu
*Assistant Examiner* — Nicholas Ulrich
(74) *Attorney, Agent, or Firm* — Thomas E. Tyson; Schubert Law Group PLLC

(57) ABSTRACT

In some embodiments a method for managing processing components using a graphical user interface is disclosed. The method can include determining connection data of a processing system automatically by communicating with at least one node of the processing system, displaying the connection data on a graphical user interface, accepting a user selection via selectable buttons on the graphical user interface, where the selectable buttons representing selectable system operations for configuring operations of nodes. Based on the user selection the system can automatically perform system configuring. In some embodiments, the method can detect improper or malfunctioning connections and automatically provide a pop-up window that has a suggested remedy. Other embodiments are also disclosed.

20 Claims, 5 Drawing Sheets

200

|  |  | NODE A | | NODE B | | NODE C | | NODE D | |
| --- | --- | --- | --- | --- | --- | --- | --- | --- | --- |
|  |  | P1 | P2 | P1 | P2 | P1 | P2 | P1 | P2 |
| NODE A 00 | P1 | N | N |  | 01 |  |  |  |  |
|  | P2 | N | N |  |  | 02 |  |  |  |
| NODE B 01 | P1 |  | 07 | N | N |  |  | 04 |  |
|  | P2 |  |  | N | N |  |  |  | 05 |
| NODE C 10 | P1 |  |  | 03 |  | N | N |  |  |
|  | P2 |  |  |  |  | N | N |  |  |
| NODE D 11 | P1 |  | 06 |  |  |  |  | N | N |
|  | P2 |  |  |  |  |  |  | N | N |

FIG. 2

ARRANGEMENTS FOR MANAGING PROCESSING COMPONENTS USING A GRAPHICAL USER INTERFACE

FIELD

The present disclosure relates generally to computing systems and more particularly to auto-configuring a multi-node computing system with a graphical user interface.

BACKGROUND

As computing needs for organizations grow, and as organizations plan for growth, one common way to plan for, and obtain economical computing is to purchase computing systems that are scalable. A system or architecture is scalable when it can be upgraded or increased in size, or reconfigured to accommodate changing conditions. For example, a company that plans to set up a client/server network, may want to have a system that not only works with the number of people who will immediately use the system, but can be easily and economically expanded to accommodate the number of employees who may be using the system after one year, five years, or ten years. In another situation, a company that runs a server farm and hosts web sites or applications via the Internet may continue to grow, and this company may desire a scalable system where they can economically add servers as needed to accommodate growth.

Accordingly, a scalable system can typically merge or integrate a number of scalable servers or chassis having one or more processors to create a "larger" unitary system having processing nodes. Thus, a collection of scalable servers can function like a single larger server when properly merged. When multiple servers are merged, they can be partitioned using hardware partitioning. A system with a single partition can run a single instance of an operating system (OS) and all the nodes of the system are thus conceptually combined. Thus, in effect, the user will experience a single, more powerful computing system functioning as one "scaled up" node, instead of a number of less powerful nodes running independently.

Currently, customers have many issues with start up and expansion of scalable systems. Much of the problems are related to cabling and configuring the scalable system. It can be difficult to configure a system, and once it is configured it can be difficult to debug problems that arise. Current implementations allow the system administrator to see only one partition from a menu, and the administrator typically has to go to other terminals to see other partitions. A partition can include a set of components, nodes, or systems in a scalable environment that are configured to work as a single entity. It can be appreciated that it is inconvenient during a set up procedure to configure all the components into different partitions not knowing which components are part of different partitions since the partitions can only be "seen" and configured from different interfaces connected to different nodes. Further, not knowing the exact cabling or if the system is properly cabled can cause additional issues.

Many other issues can arise such as maintenance and repair issues for systems that breakdown or begin running at a reduced capacity. If there are cable or connector issues, such as a broken electrical connection, traditionally, it is very difficult to find where this broken connection has occurred. The scalable system performance can drop dramatically when faults occur, as soft failures. Further it can be very difficult to determine which port and cable is causing the failure since each component can have many different ports. Even intermittent failures can cause components to re-route communication when a fault occurs, thus a "soft" failure can go undetected.

A traditional approach for combining multiple nodes of a system into a single-partition merged system running a single instance of an OS is to have a trained technician manually integrate and configure each node as a system is built or as computing resources (nodes) are added. Traditionally, a trained technician or administrator must configure each node with the proper partition configuration information, entering data to specify or configure one of the nodes as the primary, or boot node, and the other nodes as secondary nodes to the primary node. This approach is cumbersome, and requires trained technicians to build and configure such a system. When there are more than a few nodes to manually configure, the configuring process can get complex and such configuring is prone to connection and configuration errors and omissions. Traditionally, many scalable server systems utilize a management interface (a standalone computing system with specialized hardware) for most of the components in the system to properly configure and boot the connected server nodes. It can be appreciated that this approach requires costly dedicated hardware, and may require modification to preexisting systems that do not allow for the addition of such functionality.

Generally, systems in a scalable environment don't automatically know that they are cabled together and can work as one system. These scalable systems have to be told (i.e. configured by a technician) such that they know that they are cabled to other nodes and must be configured regarding how they can communicate with other nodes. There are many current designs available that utilize this manual configuration approach. One design uses a network such as an Ethernet connection between nodes and utilizes dedicated hardware such as a remote supervisor adapter (RSA) to facilitate set up of the system. Typical set up, among other things, requires a user to input the Internet Protocol (IP) addresses of each RSA, in the RSA interface before the scalable systems can work as a single entity. This process can be cumbersome for a user to discover and enter the RSA IP address for each component. This IP detection process can include booting each scalable component and after the component is connected to the network the user can request and find the IP address in the BIOS menu of the component.

SUMMARY

The problems identified above are in large part addressed by the systems, arrangements, methods and media disclosed herein to provide a method for presenting a set of screens in a graphical user interface format. The method can include determining connection data of a processing system automatically by communicating with at least one node of the processing system, displaying the connection data on a graphical user interface, accepting a user selection via selectable buttons on the graphical user interface, where the selectable buttons representing selectable system operations for configuring operations of the at least two nodes, and automatically conducting system operations based on the user selection. The method can also include displaying port identification information, serial numbers of nodes, and an indicator of a primary node. In some embodiments, the method can detect improper or malfunctioning connections and automatically provide a pop-up window that has a suggested remedy.

In another embodiment, an apparatus is disclosed that includes a processing component to accept data from a scalable system, and to generate a graphic interconnect and a partitioning configuration of the scalable system. The apparatus can include a display screen connected to the processing component to display the interconnect, the partitioning configuration, selectable buttons as part of a graphical user interface, and a pointing device to activate the selectable buttons. A user selection of the selectable buttons can configure the scalable system and display the results of such configuring. The processing component can be embodied as a personal computer.

In yet another embodiment, a computer program product is disclosed. The product can include a computer useable medium having a computer readable medium when executed on a computer causes the computer to determine connection data of a processing system automatically by communicating with at least one node of the processing system, display the connection data on a graphical user interface, and accept a user selection via selectable buttons on the graphical user interface. The selectable buttons can represent selectable system configuring options that when selected can configure operations of at least two nodes.

BRIEF DESCRIPTION OF THE DRAWINGS

Aspects of the invention will become apparent upon reading the following detailed description and upon reference to the accompanying drawings in which, like references may indicate similar elements:

FIG. 2 is a table representing how nodes can be identified and connected;

DETAILED DESCRIPTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Disclosed herein is a graphical user interface (GUI) that can display connections of a scalable processing system based on discovered connections of the system. The GUI can also display nodes that have been merged and partitioned. The configuration to be displayed can be discovered at each node by board controllers such as a baseboard management controller (BMCs). A primary node can be selected on the graphical user interface and a controller associated with the primary node or the terminal associated with the GUI can send commands to be utilized by each BMC at each node to configure each node in the partition. Other administrative features such as diagnostics can also be conducted via user inputs to the GUI.

Figure 1:
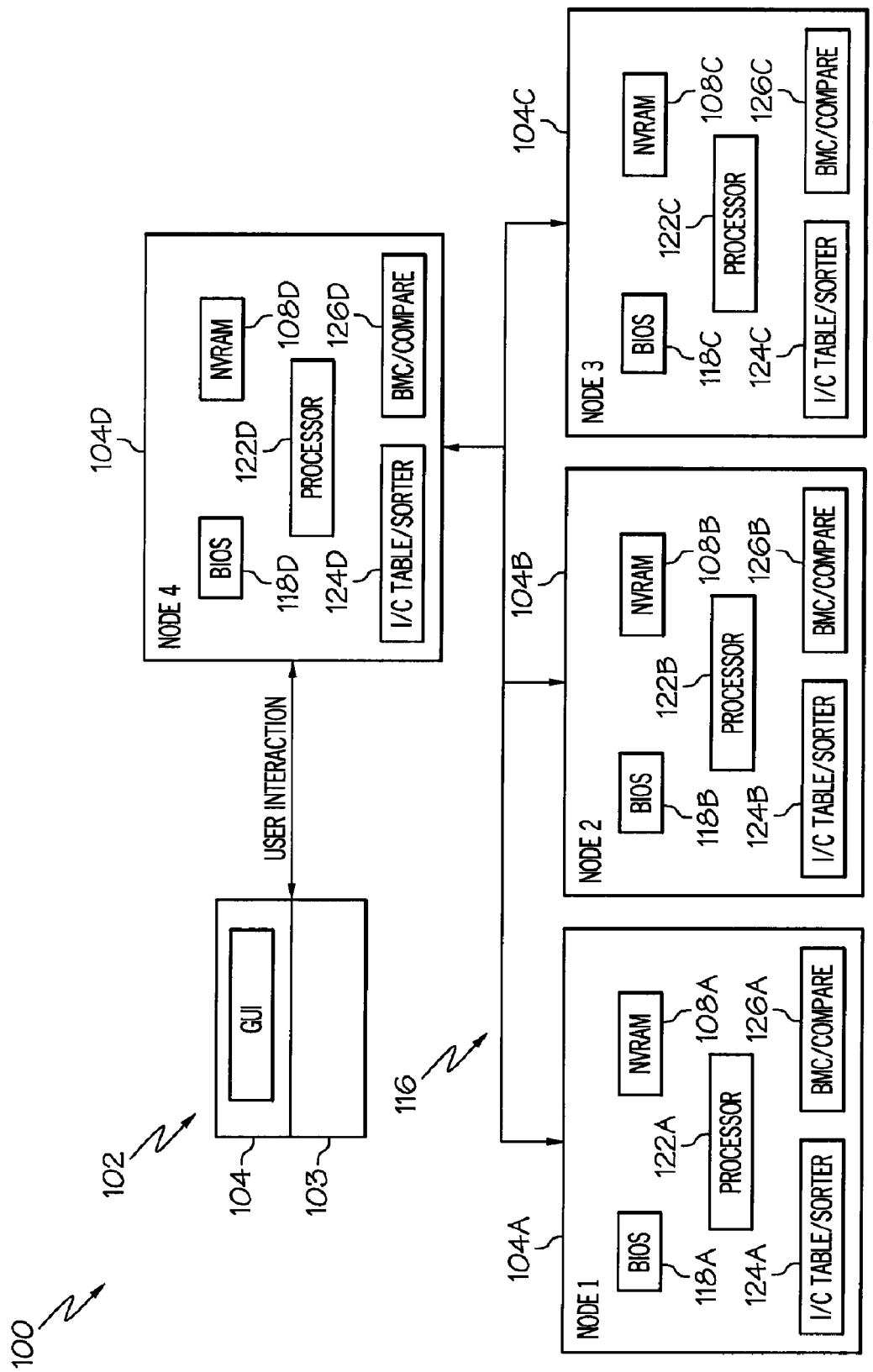
FIG. 1 is a block diagram of an auto-configuring merged system having a number of nodes.

Referring to FIG. 1, a processing system 100 that can display a system interconnect and system partitioning is illustrated. In some embodiments, the components of the system 100 can be cabled together and connected to a power source or have power applied, and after power is applied or a power cord is plugged in, the system 100 can seamlessly integrate itself into a single partition system without user intervention or a customized configuration with user input and the configuration can be displayed on a graphical user interface (GUI) 104 on terminal 102. In some embodiments, additional computing resources can be connected when the system 100 is operating, and the system can integrate or merge a newly/hot connected node "on the fly" and display such changes on the GUI.

The system 100 can include many nodes, such as nodes 104A, 104B, 104C and 104D (referred to herein collectively as nodes 104) as where each node can be a processing resource such as a scalable server. However, this disclosure is not limited to any fixed number of nodes or any type of processing resource. Thus, nodes 104 can represent any resource such as a peripheral device or processing resource that can be scaled.

As can be appreciated, the nodes 104 may include other components in addition to and/or in lieu of those depicted. Furthermore, nodes 104 are meant as representative of one type of node in conjunction with which embodiments can be implemented. Embodiments of the system 100 are also amenable to implementation in conjunction with other types of nodes, as can be appreciated.

Nodes 104 can be coupled to one another via an interconnect system 116. The interconnect system 116 can be implemented via cabling where cables are plugged into "scalable ports" in the chassis or circuit boards of the nodes 104. A node 104 can send and receive set up information and commands from other nodes 104 via interconnect 116. The nodes 104, possibly servers, may physically be located within a single rack or the servers could be distributed over different server racks at various locations within the range of the interconnect system. Each node 104 can include a basic input/output system (BIOS) 118A, 118B, 118C and 118D (collectively as BIOS 118), non-volatile random-access memory (NVRAM) 108A, 108B, 108C, and 108D (collectively 108) and baseboard management controllers (BMC)s 126A, 126B, 126C and 126D (collectively 126). The nodes 104 may also include components in addition to and/or in lieu of those depicted. For example, the BMCs 126 can have a compare module to compare self-discovered connections to data in the table 124.

A system owner, user, or system administrator can connect an input/output device or terminal 102. The terminal 102 can be what is commonly referred to as a remote supervisor adapter (RSA). The terminal 102 can be connected to the nodes 104 to monitor configurations of the nodes 104 and of the system and possibly change a default or predetermined system configuration to a custom or user selected configuration, if desired. The terminal 102 can have a user interface 103. The user interface can include a touch screen, a pointing device such as a mouse, a touch pad, a keyboard, a trackball etc. The terminal can also have a display 104 and can be connected to any node 104 or to a portion of the interconnect 116 such that the terminal can receive data and can transmit commands to nodes 104. Via the terminal 102, the user can interact directly with the BMCs 126 and interact with the BIOSs 118.

Thus, the terminal 104 can automatically send configuration instructions to the BIOSs 118 and these instructions can provide start up and set up instructions to each node 104. The BIOS 118 may be a set of instructions or routines stored in NVRAM 108 that allows each node 104 to configure itself in a manner that will dictate basic operating functions of each node. Accordingly, the BIOS 118 routine can provide an interface between the operating system (OS) and the hardware, and can control at least some of the functionality of each node 104 and the system 100.

For example, the BIOS 118 can control a power-on self test (POST), a node interconnect detection system, a partitioning configuration and can accept commands from the terminal 102 and load version of the BIOS based on the command(s). In some embodiments, the commands from the terminal 102 can be received by one BMCs 126 or BIOS 118 and the BMC 126 or BIOS 118 can load executable instructions and can configure a node based on the commands from the terminal 102. For example, based on a command from the terminal 102 that identifies a primary node and nodes associated with the partition, a node can establish itself as a primary node and this primary node can send configuration data to another node in its partition such that other nodes associated with the primary node can configure themselves as a secondary node.

Thus, in a partition a primary node can configure itself with secondary nodes, and nodes in the partition can interact and efficiently split up a processing task then execute the task at the multiple nodes and then organize the results from the nodes such that efficient processing of a task can be achieved. Thus, the commands from the terminal can configure primary nodes which in turn can configure the nodes associated with the selected primary node. In other embodiments BMCs of secondary nodes can read partition configuration information from the BMC of the primary nodes and secondary nodes can reconfigure themselves (or change what instructions are loaded) in preparation for partition based merging. The BIOS 118 can control the above mentioned functionality and additional functionalities and can operate at each mergable node 104. The NVRAM 108 can retain the BIOS contents even when power is not supplied to the node 104. The NVRAM 108 can also store the firmware for the processors 122A, 122B, 122C and 122D (collectively 122). The processors 122 can be a single processor, a series of processors or a multi-core processor.

As stated above, each BMC 126 can act as a facilitator of the auto-merging/auto-partitioning process and can interact with the BIOS 118 of each node. In some embodiments, the nodes 104 can be connected by cables, including power cables and then, without user intervention, the BMCs 126 can automatically discover what connections exist and each BMC 126 can configure the operation of their respective node 104 such that the system boots and operates as a unitary/single partition system. The system can auto-configure in a "similar" way to what is referred to as a "plug and play" system in personal computer (PC) technology.

Plug and play systems configure newly connected devices with code that is part of an operating system. In contrast, in some embodiments of the disclosed arrangements, the auto-configure portion of the system 100 is not part of an operating system, but can be performed with a software layer that underlies the operating system, where operation is transparent to many different operating systems which the system 100 can support. However, the GUI is not limited to operating as a system that operates "underneath" an operating system and automatically detects the environment beneath it, as the system that supports the GUI can operate at any level. For example, the GUI system can be connected in some form to a component of the scalable environment that is aware of the scalable environment and the system supporting the GUI can present at least a portion of this environment in a graphical representation to the user. In addition the GUI can have the ability to auto configure itself.

Thus, the operation and actions of auto-merge system 100 can occur prior to the loading of the operating system code and can operate virtually transparent to the operating system. It can be appreciated that different operating systems can utilize the system 100 as a platform without affecting the system configuration settings such as the partitioning. The BMCs 126 can provide an interface mechanism for automatic recognition of connections for all nodes 104 for addressing each node 104 and a BIOS load for each node. This interface feature can provide the capability of transmitting or receiving partition configuration data and for dispersing the processing workload presented to the system 100. The BMCs 126 can also control the turn on, or turn off of various portions of the merged system 100, and the BMCs 126 can reset the processors 122 within the merged system 100.

As part of the auto-configuration process, each BMC 126 can perform an automated self-discovery for the presence of connected nodes 104 and each port of each node 104. During this connection discovery process the BMCs 126 can create a connection matrix or connection table 124 representing the interconnection of the system 100. This self-discovery process can commence when power is connected to the nodes 104 even though the power switch is not turned on. The BMCs 226 can conduct a "system self-discovery" by automatically mapping the interconnect configuration when power is applied to each node 104 and the power switch for the particular node is in an off state. Such a mapping configuration can be stored in the form of interconnect (I/C) tables 124A, 124B, 124C and 124D (collectively tables 124). The tables 124 can also have a sorter module such that the connection data entered into each table can be "identically" sorted or sorted according to the same instructions. For example the connection data can be sorted according to a hierarchy of UUIDs. Further after the mapping is complete, the BMCs 126 can configure the system 100 as a unitary or single partitioned system according to a default setting. In other embodiments, a default setting or a user configured setting can create multiple partitions.

In some embodiments, the self configuring/self merging system 100 does not require the user to input any values or provide any configuration data, and the coupled nodes 104 can communicate and exchange connection information and can configure a shared processing configuration and an addressing scheme such that the system 100 can operate as a homogenous system. As stated above, it can be appreciated that this sub-OS plug and play arrangement can operate with many different operating systems as the self configuring set up can run "under" or transparently to whatever operating system is installed on the system 100. Thus, the described sub-OS, plug and play system provides a user friendly, "hands off" solution to scalable system management of nodes.

As stated above the system 100 can automatically configure cabled nodes 104 where multiple nodes can create a system 100 that appears to operate or work as a single system or single unit. The system 100 can assign unique identifiers to each port of each node such that each table 124 is identical. From the factory, each component (that is connected as a node) can have a universally unique sixteen byte identifier. The BMC 126 can get the identifier by querying the node or port and organize the table 124 in a hierarchy according to the numeric, alpha or alpha numeric magnitude of the identifier.

Thus, all tables generated should have the same components in the same order. The interconnect data can be codified in a table format. Since a unique sixteen byte identifier has more bits than are needed for addressing communications between the small number of ports or nodes of the system 100, after the table is generated each node can be assigned an index; possibly a four bit unique identifier where the index could start at "00" counting up where the last node (component with the highest or lowest factory assigned identifier) could have an "03" index where four nodes were present in the system 100. In some embodiments, eight or more nodes can be accommodated.

This unique index can be utilized as an address and allow all of the scalable sub-components or nodes 104 to communicate with each other by using the index/address in a header of transmissions. Each node 104 of the scalable systems can determine and generate a table where each sub-component should, when connected and operating properly, build or create the same table during the connection discovery process. Thus, because the nodes 104 can order the hardware in the same manner and assign consecutive numbers to the ordered hardware, identical tables 124 can be generated. When tables 124 are not substantially identical, the BMCs 126 can recognize this, and can regenerate the tables until all BMCs 126 generate an "identical" table.

In some embodiments, when power is initially applied to a node 104 (with the power switch off), the BMC 126 can perform a software load from non-volatile memory and can conduct a self test by executing code within the BMC 126. After a successful self-test, each BMC 126 can initiate a self-configuration procedure, which can include a partitioning routine. Each BMC 126 can also query other BMCs and check for the presence of descriptors of connections (populated tables) via scalable interconnections with other nodes. The BMCs 126 can also monitor communications by reading addressing or header information and can detect connection descriptors. The descriptors can indicate that other BMCs 126 in the system 100 are already cabled together and communicating. If descriptors are detected during the initialization communications, the BMCs 126 can begin a self-configuration process to verify the integrity of the descriptors. In some embodiments, the BMC 126 can check to make sure its nodes are connected to ports of other nodes and that the descriptors match what is indicated by the detected descriptors.

When power is applied to a BMC 126 at a node, the BMC 126 can determine if the system has a primary node operating or assigned. If the BMC 126 cannot find a preexisting primary node to "join," it can become a primary node for the new system. In some embodiments, a system can auto configure or auto determine a primary node based on a hierarchy of universally unique identifiers (UUIDs). For example, the BMC 126 associated with the highest valued UUID or lowest could be elected and recognized by all BMCs 126 as a primary node. Such a process could also occur when a primary node leaves the system or becomes inoperable.

In some embodiments, each BMC 126 can perform a port query for ports that are not directly connected to the BMC but are "indirectly" connected to the BMC 126. By querying beyond the directly coupled ports, a BMC 126 can capture remaining unique identifiers for any other nodes in the system 100 or complex. This "hopping" inquiry process can produce a complete list of available systems for the complex where each node 104 is identified by the unique identifier.

Each node 104 can sort the list of unique identifiers in the complex descriptor. The index number into the sorted unique identifier list can become a unique node number that the nodes use to communicate with specific nodes 104 of the system 100. Each node 104 can search tables 124 for its unique identifier (index) and can assign its own node number to the index of the entry. The node number is sufficient for any node to communicate with any other node in the interconnected complex. Partition IDs can then be assigned to groups of nodes in the complex so that power control is coordinated within the partition group, thus permitting the partition to boot as a single OS. Each BMC 126 can verify the complex descriptor by sending the local port connections to all the other BMCs 126. Such sharing of information can ensure consistency in table data.

Referring to FIG. 2, a table 200 of possible system interconnections that can be generated by a BMC is illustrated. Each component connected as a node that can be connected as a node can have a factory assigned unique sixteen byte identifier. The component can transmit this identifier in response to query's transmitted from other BMCs or components and all BMCs can store these unique identifiers and sort them from high to low or low to high. Accordingly, each BMC can organize the table 200 in the same order (i.e. from highest identifier value to lowest identifier value or lowest identifier at the top of the table and the highest valued identifiers at the bottom of the table).

This can be referred to as a sorting rating or ranking process. Using this hierarchy, each table created by each BMC can be substantially identical and should have substantially identical data. In the table 200 provided, a four node interconnect is illustrated where each node has two ports identified as P1 and P2.

In the table 200, N's are placed to indicate that this embodiment does not couple ports at the same node together, although this could be done. In the table 200, node A has been assigned a unique identifier 00, node B 01, node C 10, and node D 11. Such identifiers could be utilized for addressing of communications. In addition, the unique connections between ports have been assigned a unique identifier. For example, the connection between node B port 2 and Node A port 2 has been assigned the unique identifier "07." As stated above, each BMC can access the tables stored by other BMCs to check specific connections or to compare every piece of data in one table to every piece of data in another table. Many other table configurations could be utilized without parting from the scope of this disclosure.

Further, as additional nodes are added to the system, the connections of the newly connected components or nodes can be automatically detected by all BMCs and the BMCs can configure/reconfigure the table 200 and the BIOS of all connected nodes such that they can function as one system. Thus, each node can automatically reconfigure, when a new node is added such that the newly connected resource can automatically and seamlessly integrate with existing operating resources. Scalability cables can be hot plugged, so that servers can be introduced into the complex and automatically detected while other systems are operational. The disclosed arrangements can also allow scalable server components to discover how to communicate with the other scalable systems without the requirement for the functions traditionally provided by a processing sub-system that configures according to user input. In some embodiments the self-configuration aspect described herein can be displayed to a user as the self configuring occurs, however this self configuring can be a separate substantially unrelated feature. In other embodiments the GUI can operate as an interface that controls the self-configuring process and a custom configuring process and can send user originated commands to components of the scalable system.

As stated above, traditional systems utilize a relatively complex and overhead intensive Ethernet connection to communicate set up information. Furthermore, traditional systems require significant user input or user assistance to configure the system and make it operable. Generally, the disclosed scalable system is not limited by any particular operating system because the auto-merging can be performed transparently to the OS allowing the system to run many different operating systems.

The disclosed system can avoid the need to "check" through systems that cannot be scaled, such as those that appear through SLP discovery. A monitor for the system is not required, however if someone wants to view system settings, a monitor can be connected to the system. In addition, the systems and methods can free up Ethernet connections for other purposes and uses because only one node needs a terminal when someone wants to view how the system is set up for every node in the complex or scalable environment. In some embodiments, the system can utilize a smart terminal such as a RSA to operate the GUI and can utilize an Ethernet connection to communicate between a node and the smart terminal. In other embodiments a dumb terminal can receive data from a node via a scalable port connection or specialized port and can display such data. Thus, the processing of data that provides the GUI and the control for the system can be resident at different locations such as at a BMC.

Each scalable node can communicate with all the other scalable nodes through designated ports and cabling to build and populate the table. In some embodiments, the BMCs can provide management functions for the nodes and create control settings based on the contents of the table. To facilitate communication between the scaled nodes, the BMCs can create, assign and coordinate a unique identifier to each node and each port as shown at the left margin of the table 200. Such unique identifiers allow specific commands to be sent to specific systems and different commands to be sent to the different nodes. When a message is sent across the cabling, the nodes in the scalable system can know the intended recipient of the message by receiving the unique identifier and index (aka node ID) using the table 200 and by comparing the received identifiers to an identifier stored locally in the table 200.

Figure 3:
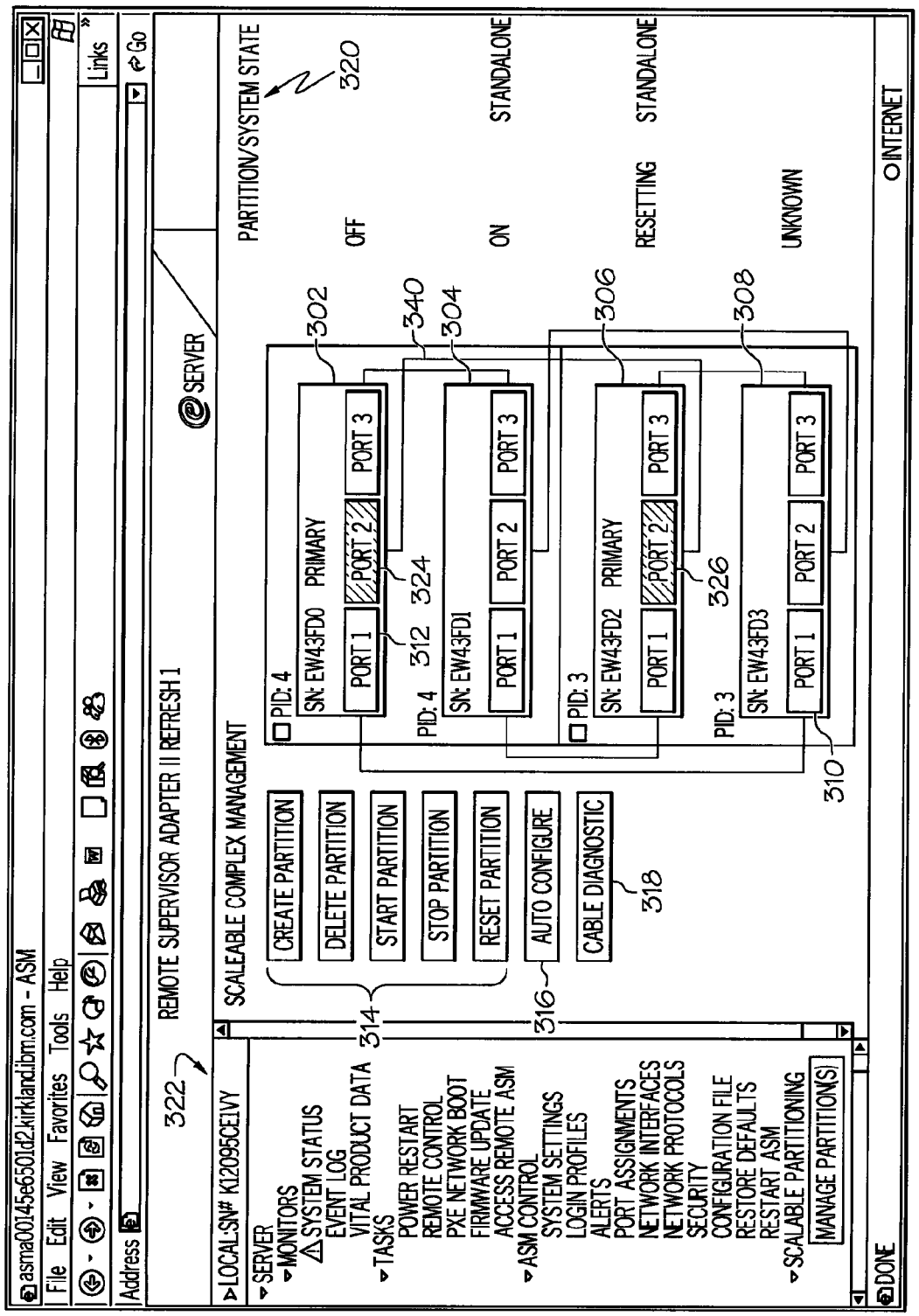
FIG. 3 is a representation of a graphical user interface of a scalable processing system.

Referring to FIG. 3, a graphical user interface (GUI) 300 that allows for managing a scalable processing system is depicted. As stated above, the system, upon interconnection and connection of a power cord can self-discover connection data. The self discovered data can be put in a table format such as illustrated by FIG. 2. Further, data such as that illustrated by FIG. 2 can be utilized to generate the graphical representation depicted in FIG. 3. The disclosed embodiments can simplify the user interaction required to configure and control a scalable processing system. In this embodiment, there are four nodes in the system and correspondingly four nodes 302, 304, 306, and 308 (302-308) are displayed. Each node 302-308 can have multiple ports to accept cables that can interconnect ports from different nodes. For example, port 310 is shown illustrated as connected with port 312 via a line that represents a cable.

In the illustration, the terminal facilitating the GUI has received data indicating the number of nodes in the system and how the nodes are connected. Lines such as line 340 between the different ports represent the port connections that allow for system scalability. In the illustration connections have been discovered by a board controller that has communicated with at least one node and the connection data has been transmitted to the terminal and displayed on GUI 300. Such connection information can be retrieved or received from each or every node 302-308 or the connection information can be determined by passive listening of communications between the nodes.

Accordingly in the disclosed embodiment, configuration management and maintenance of a scalable system becomes more manageable than with traditional systems because of the situational awareness provided via the GUI and because multiple control commands can be originated or generated by a single user input such as a user selection of a selectable button on the GUI 300. In some embodiments, a user can view the configuration settings of the system and change the configuration or induce a maintenance operation of the system by a single input such a "one click" on a pointing device. For example, pointing and clicking on cable diagnostics 318 can start a diagnostic routine while selecting start partition can send partition configuration commands. Other testing and configuration changes can be accomplished by selecting selectable buttons 314, 316 and 318. In some embodiments, the GUI provided 300, can clearly indicate to a user, a graphical representation of the components of the systems such as the nodes 302-308, how they are interconnected and how they are partitioned. Further the GUI can show dynamically how changes are being implemented real time.

In the illustration, two partitions have been created as evidenced by node 302 being labeled as a primary node, for the partition that includes node 302, and node 304 and node 306 being labeled as a primary node for the partition that includes nodes 306 and 308. Partitioning control can be accomplished by selecting a node and the selecting a partitioning function selection such as provided by the selectable buttons 314. Column 320 can provide information regarding a partition status or a system state for each node. Some of the partition states that can be configured are: an "off" state, an "on" state, a "resetting" state, and an "unknown" state. The display of this information on a user interactive GUI, allows the user to view, create, configure, manage and control partitions for the system. Images of the components or nodes 302-308 and their ports and how the ports are interconnected or cabled together can eliminate the need to look for, and trace cables from port to port.

In addition, the current state of the components, such as whether power is applied and whether power is turned on at the component and how the components are cabled together, and how they can be called together can be analyzed by the system and possible improvements to the interconnect, can be suggested to the user to maximize performance as will be described below. The management controls in column 322 for the systems can be displayed concurrently with an interconnect configuration and status data. Selection of a type of control, tasks or monitoring in column 322 (in the example "manage partition(s)" is selected at the bottom of the column 322) can provide a subset of selectable choices such as selectable buttons 314, 316 and 318.

Automatically, or based on user commands, via the GUI 300, a transmitter can send information to the nodes or board controllers at each node and such a transmission can control all the necessary controllers of the scalable environment such as to BMCs or BIOS systems.

A single signal generated by interaction with the GUI can send a single signal to a single possibly primary node and the nodes can then communicate and configure via inter-node communications. Thus, the instructions supporting the GUI user interaction can automatically send configuration instructions to nodes and these instructions can provide start up and set up instructions to each node. The instructions can allow each node to configure itself in a manner that will dictate basic operating functions of each node such as how nodes share a processing task. Accordingly, the "one click" command can control at least some of the functionality of each node of the system.

In some embodiments a single user selection on the GUI 300 can control a power-on self test (POST), a node interconnect detection system, and a partitioning command or function of a particular selected node or all nodes. After a node is selected and assigned a function by the user via the GUI 300, the GUI 300 application can transmit commands that are sufficient to configure control functions of the selected node. In some embodiments, the commands from the GUI application 300 can be received by one controller at one node and the controller can load executable instructions and can configure a partition based on the commands from the GUI application 300. For example, based on a command from the GUI application 300 that identifies a primary node and nodes associated with the primary node to form a partition, a node can establish itself as a primary node and this primary node can send configuration data to another node in its partition such that other nodes associated with the primary node can configure themselves as secondary nodes.

Board controllers can then partition the system and manage other settings or features related to processing tasks. The GUI 300 can simplify use and manageability of the scalable environment for the customer, user, administrator or technician. The GUI 300 can also make it easier for the user to debug issues associated with the cabling and port connections because responsive to user input such as "a point and click" on the GUI 300 all or nearly all to the scalable connections can be tested and a status of these connections can be displayed. More particularly, selection of button 318 can initiate a system diagnostic. Making the interconnection visible to the customer on the GUI 300 can make it easy for a user to identify incorrect cabling such that the user can detect when there are issues with the interconnection and with system operation.

As stated above, traditional scalable systems often require that a common description of the "entire" scalable environment (such as unique identifiers and connections) be manually entered by a human and further that this information be stored at each interface of the system. The common description can include data representing actual connections, node and port identifications, how many systems are cabled together, how each port is connected, how each node is configured, what state each node is in and power statuses. The GUI application can substantially eliminate the need to discover and manually enter such data. The GUI application 300 can be displayed on a terminal such as a remote supervisor adapter (RSA) in an easy to understand format. In other embodiments, a personal computer can be utilized to query and interpret the data stored by one or each node and display it to the user.

On the left margin 322, there is a scalable partitioning section in the tree format. One selectable button that has been selected is "manage partitions (in the white box at the bottom of the page). The selection of this button has prompted the system to display the current view. The terminal can read the information from one or more BMCs and present the system configuration information on the GUI 300 according to what the queried BMC has stored regarding system data.

Each partition can be given a specific color and each partitioned system can be labeled with the partition ID in the upper left corner of its partition box (of the node). In the illustration, node 302 and 304 have a partition ID of and node 306 and 308 have a partition ID of 3. A check box can be provided in the upper left hand corner of the node block to select a node as a primary node. In some embodiments, only one node in a partition may have a controllable checkbox that will allow a particular node to control the partition. The controllable check box can be assigned as a first system or the primary node. Selecting the check box allows the GUI to relay commands from selectable buttons 314, 316 and 318 to a particular node. To the right of the nodes 302-308, the state of the system column 320 can display product data, system configuration, other useful system information and whether the system is in a standalone state.

In FIG. 3, the administrative software has discovered that there is invalid cabling in the system. It can be appreciated that nodes 306 and 308 are not fully operational as a partition. In some embodiments a user can temporarily run a node in a stand-alone mode where the node performs as a single node partition and the previous multi-node partition information can be stored such that the multi-node partition can be restored after the temporary stand alone setting is removed. Thus, in column 320 they have been labeled as resetting and unknown because the primary node of the partition 306 has been placed in a stand-alone mode. It can be appreciated that the partition state of resetting or unknown does not indicate that a node is, or is not in a partition. In some embodiments the color of the system or the color of the partition box on the GUI could indicate that a node is or is not in a partition. Any node could be in standalone mode or the partition could be in resetting or an unknown state per the user selection. In some embodiments, pointing and clicking or selecting the serial number ("SN" in the upper left corner of the node box) can be a way to select the primary node. After a primary node is selected a "Create Partition" button can be activated such that it is selectable.

In FIG. 3, node 302 port 2 324 has been connected to node 306 port 2 326 and the cross hatching on the ports indicates that there are port issues (an inoperable port) or that the cabling is invalid. In some embodiments, invalid or inoperable connections can be displayed in red. When a cable such as cable 340 becomes red, it can indicate that the cable is connected incorrectly or possibly that there could be a problem with integrity of the cable or the connection at the port.

The selectable buttons 314, 316 and 318 can control the behavior of the partition or systems. The "Create Partition" button can perform an action when there is more than one system available to be added to a partition and a primary node is selected or available. If these requirements are not met, selection of the "Create Partition" can display an error to the user describing what they need to do to create a new partition. The "Delete Partition", "Start Partition", "Stop Partition" and "Reset Partition" buttons can start, stop and reset partitions or individual systems in the complex. A user may select one or multiple partitions and control them at the same time.

The "Auto Configure" button 316 can create a partition from all the components in the system. If some of the systems are in a partition already, the GUI 300 can prompt the user if the user wants to "tear down" that partition to create the single partition. If the user would like to form a single partition system, the button can tear down all current partitions and configure the whole complex as a single partition with a single user input. The "Cable Diagnostics" button 318, when activated, can send a command to a BMC to check all the cables in the complex and will update the screen with any new findings. The partition ID can provide a link to a page that controls the platform options for that partition and any settings that need to be consistent on every system in a partition. The platform options can include merge timeout, allow merge with missing systems, etc.

In some embodiments, the ports that are indicated as "invalid" or inoperable can become selectable links. When a user selects or "clicks on" or selects an invalid link or command, the GUI can provide a pop-up window with a suggested "correct" cabling diagram for the scalable system. In addition, a textual version could be provided that instructs actions that could be taken by the user to fix a problem or properly configure a system.

Figure 4:
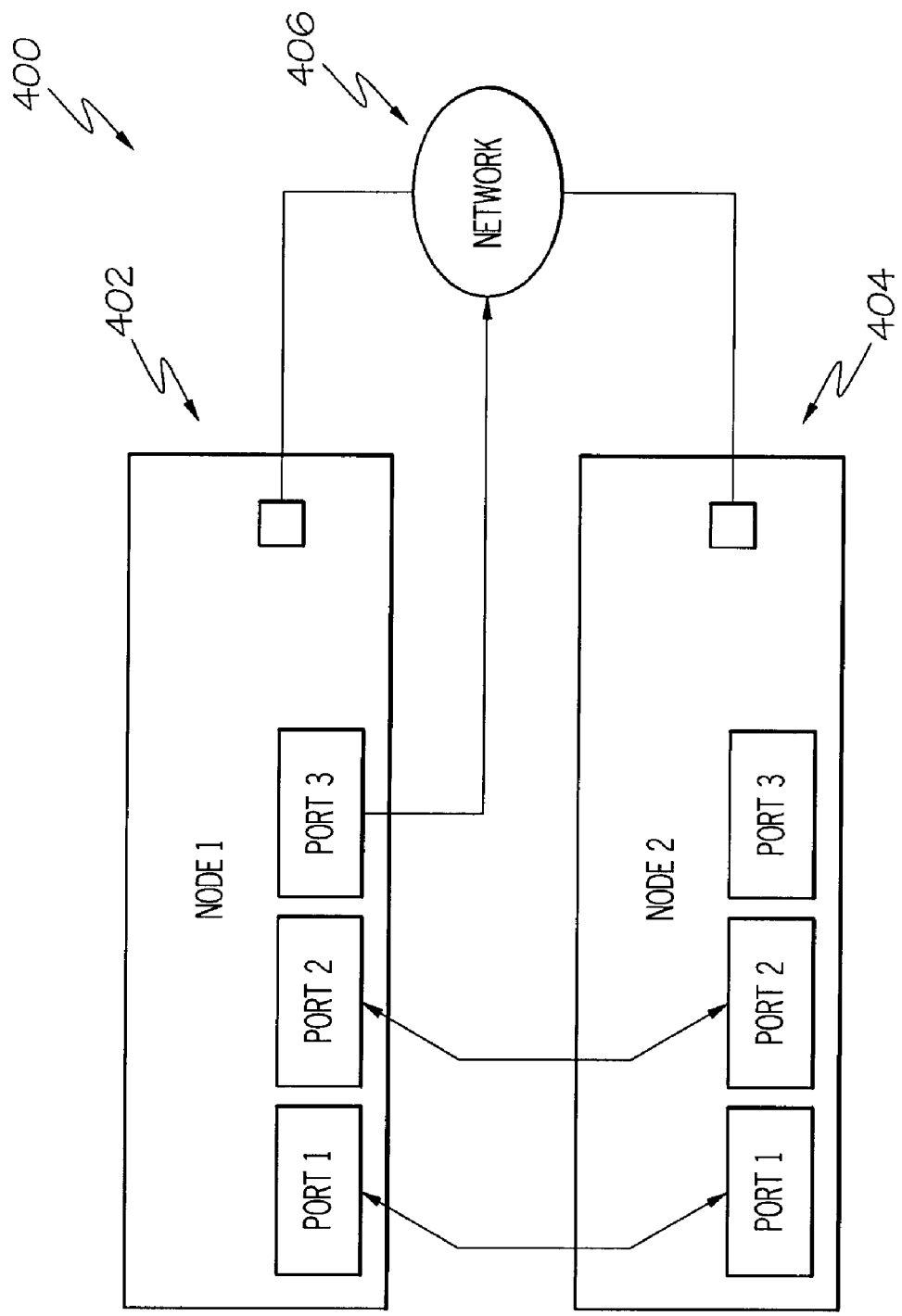
FIG. 4 is a representation of a pop-up screen for a graphical user interface.

In FIG. 4, a pop up window 400 is illustrated where a user has selected a selectable button related to a problem port or link or to a configuration button where the request could not be implemented due to cabling etc. In the illustration, connection between node 402 and 404 is illustrated and proper or suggested cabling between the nodes is illustrated. Also, the administrative terminal 406 is also illustrated.

Figure 5:
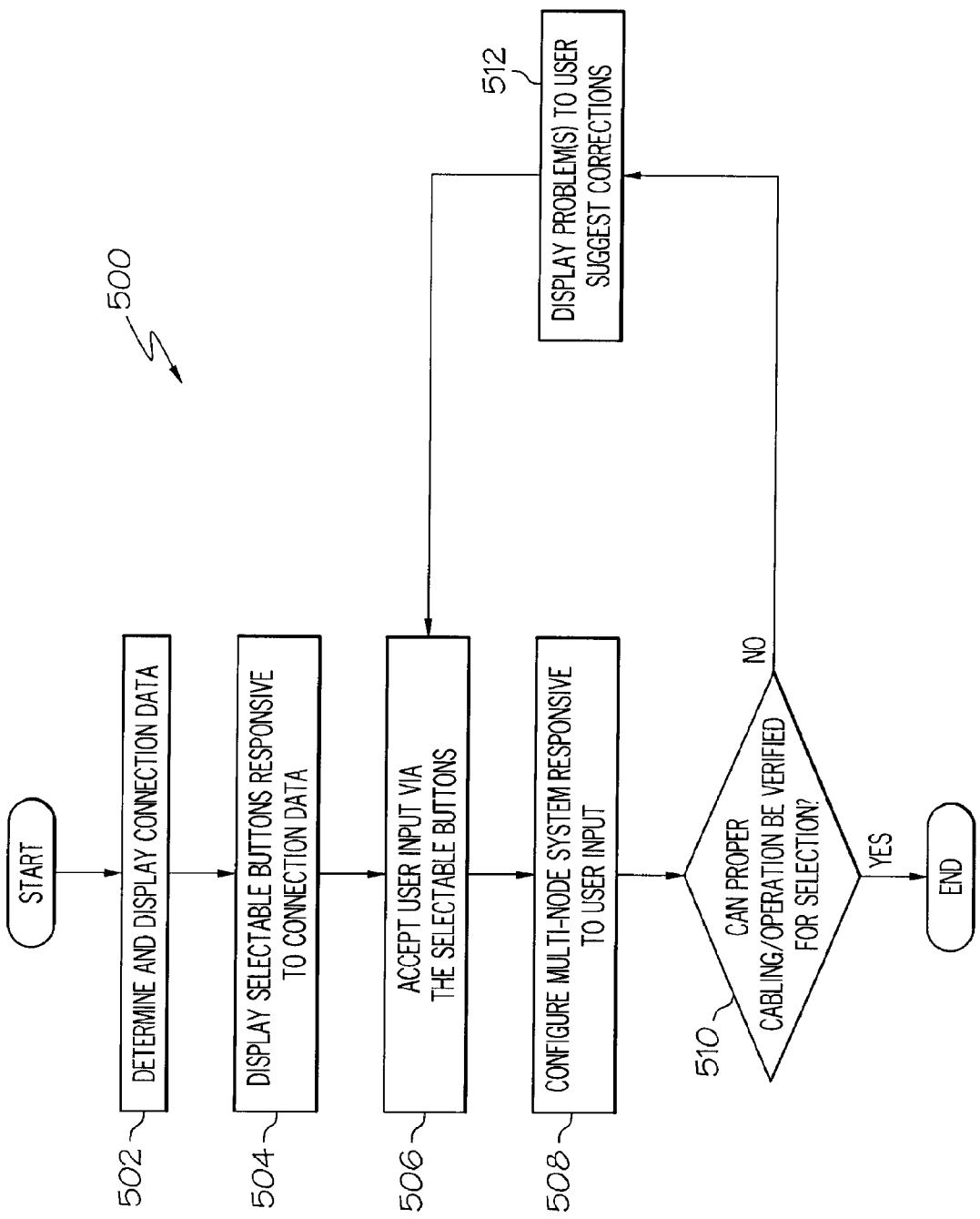
FIG. 5 is a flow diagram of a method of displaying and configuring a scalable processing system.

Referring to FIG. 5, a flow diagram 500 of a method of configuring a multi-node system is disclosed. Referring to block 502, connection data can be determined and displayed to the user in a way representative of how connections and cabling is configured. Selectable buttons can be displayed in response to the connection data, as illustrated by block 504. The selectable buttons can be configured based on the determined connections, as not all configuration options may be available for specific interconnections. For example, if a component is not connected or powered then, that component cannot be selected to be added as a partition. As illustrated by block 506, user input can be accepted via the selectable buttons. The multi-node system can be configured responsive to the user input as illustrated by block 508.

As illustrated by decision block 510, connection data can be verified for a desired operation and if the connection data can be verified then the process can end. If the connection data cannot be verified to support a desired operation, then errors or suggested changes can be displayed or provided to the user as illustrated in block 512. Then the system can again accept user input as illustrated by block 506 and the system can iterate and proceed to reconfigure until the user selection can be implemented.

Reference to particular configurations of hardware and/or software, those of skill in the art will realize that embodiments of the present invention may advantageously be implemented with other equivalent hardware and/or software systems. Aspects of the disclosure described herein may be stored or distributed on computer-readable media, including magnetic and optically readable and removable computer disks, as well as distributed electronically over the Internet or over other networks, including wireless networks. Data structures and transmission of data (including wireless transmission) particular to aspects of the disclosure are also encompassed within the scope of the disclosure.

Each process disclosed herein can be implemented with a software program. The software programs described herein may be operated on any type of computer, such as personal computer, server, etc. Any programs may be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet, intranet or other networks. Such signal-bearing media, when carrying computer-readable instructions that direct the functions of the present invention, represent embodiments of the present disclosure.

The disclosed embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A data processing system suitable for storing and/or executing program code can include at least one processor, logic, or a state machine coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

It will be apparent to those skilled in the art having the benefit of this document that the present disclosure contemplates methods, systems, and media that provide a driver with situational awareness information. It is understood that the form of the invention shown and described in the detailed description and the drawings are to be taken merely as examples. It is intended that the following claims be interpreted broadly to embrace all the variations of the example embodiments disclosed.

What is claimed is:

1. A method for configuring a processing system, the processing system comprising a plurality of nodes, the method comprising:
   determining connection data of the processing system automatically by communicating with at least one node of the processing system, the determining comprising:
   querying, by each node of the plurality of nodes, ports to request unique identifiers of the other nodes of the plurality of nodes;
   storing, by each node of the plurality of nodes, the unique identifiers for the other nodes of the plurality of nodes;
   determining, by each node of the plurality of nodes, an association of index numbers with the node and each of the other nodes of the plurality of nodes based upon an ordering of the unique identifiers associated with each of the plurality of nodes, to uniquely identify each of the plurality of nodes with the index numbers;
   determining, by each node of the plurality of nodes, a unique index number of the index numbers that is associated with the node by the association;
   querying, by each node of the plurality of nodes, the other nodes of the plurality of nodes to verify at least a portion of the association; and receiving, from a port, by each node of the plurality of nodes, the association as determined by another node of the plurality of nodes;

generating graphical representations, on a graphical user interface on a display, of the connection data for nodes comprising ports of the processing system based upon connection data from a descriptor that describes the processing system, that was determined by a node of the processing system, and that was received by the node from another node of the processing system, wherein the descriptor is based on an ordering of unique identifiers associated with the nodes in the processing system;

displaying, on the graphical user interface on the display, identification information in relation to each node of the plurality of nodes to identify each node of the plurality of nodes to the user based upon the connection data;

generating graphical representations, on the graphical user interface on the display, illustrating cabling between the ports of the nodes of the plurality of nodes, wherein the graphical representations of the cabling interconnect the graphical representations of the nodes based upon the connection data;

displaying selectable buttons on the graphical user interface, wherein the selectable buttons represent selectable system configuring options to configure operations of the processing system;

accepting a user selection via the selectable buttons to configure a partition of the processing system via the graphical user interface; and configuring the partition of the processing system responsive to the user selection.

2. The method of claim 1, further comprising displaying a node identification number.

3. The method of claim 1, further comprising displaying port identification information.

4. The method of claim 1, further comprising displaying a partition identifier of a node.

5. The method of claim 1, further comprising displaying an indicator of a primary node.

6. The method of claim 1, further comprising detecting an improper connection configuration and displaying a suggested action.

7. The method of claim 6, further comprising automatically displaying a suggested connection configuration in response to detecting the improper connection configuration.

8. The method of claim 1, further comprising detecting a malfunctioning communication link and displaying an indication of the malfunctioning communication link.

9. The method of claim 1, further comprising transmitting commands to at least one board controller in response to accepting a user selection, wherein the user selection comprises selection of a graphical representation of a node associated with the board controller.

10. The method of claim 1, wherein the illustrating cabling between the ports of the nodes comprises displaying, in a single graphical representation:
a first and a second node of the plurality of nodes;
a port of the first node;
a port of the second node; and
cabling connected the port of the first node and the port of the second node.

11. A processing system, the processing system comprising a plurality of nodes, each node comprising:
a memory;
a display; and
a processing component coupled with the memory and the display, wherein the processing component is configured to determine connection data of the processing system automatically by communicating with at least one other node of the processing system, the determining comprising:

querying, by the each node, ports to request unique identifiers of the other nodes of the plurality of nodes;

storing, by the each node, the unique identifiers for the other nodes of the plurality of nodes;

determining, by the each node, an association of index numbers with the node and each of the other nodes of the plurality of nodes based upon an ordering of the unique identifiers associated with each of the plurality of nodes, to uniquely identify each of the plurality of nodes with the index numbers;

determining, by the each node, a unique index number of the index numbers that is associated with the node by the association;

querying, by the each node, the other nodes of the plurality of nodes to verify at least a portion of the association; and receiving, from a port, by the each node, the association as determined by another node of the plurality of nodes, wherein the processing component of at least one node of the plurality of nodes is:

to generate graphical representations, on a graphical user interface on the display of at least one node, of the connection data for nodes comprising ports of the processing system based upon connection data from a descriptor that describes the processing system, that was determined by a node of the plurality of nodes of the processing system, and that was received by the node from another node of the plurality of nodes of the processing system, wherein the descriptor is based on an ordering of unique identifiers associated with the plurality of nodes in the processing system;

to display, on the graphical user interface on the display, identification information in relation to each node of the plurality of nodes to identify each node of the plurality of nodes to the user based upon the connection data;

to generate graphical representations, on the graphical user interface on the display, illustrating cabling between the ports of the nodes of the plurality of nodes, wherein the graphical representations of the cabling interconnect the graphical representations of the plurality of nodes based upon the connection data;

to display selectable buttons on the graphical user interface, wherein the selectable buttons represent selectable system configuring options to configure operations of the processing system;

to accept a user selection via the selectable buttons to configure a partition of the processing system via the graphical user interface; and to configure the partition of the processing system responsive to the user selection.

12. The apparatus of claim 11, further comprising a board controller where the processing component is further configured to query the board controller to get interconnect information.

13. The apparatus of claim 11, wherein the processing component is at least part of a remote terminal.

14. The apparatus of claim 11, wherein the processing component is further configured to process user input from the graphical user interface, wherein the user input comprises selection of a graphical representation of a node and an operation and processing the user input comprises performing the operation with the node.

15. A computer program product comprising a tangible computer readable medium, wherein the tangible computer readable medium comprises instructions, which when executed on computers comprising a plurality of nodes of a processing system:

cause each computer comprising the plurality of nodes of the processing system to determine connection data of the processing system automatically by communicating with at least one other node of the processing system, the determining comprising:

querying, by the each computer, ports to request unique identifiers of the other nodes of the plurality of nodes;

storing, by the each computer, the unique identifiers for the other nodes of the plurality of nodes;

determining, by the each computer, an association of index numbers with the node and each of the other nodes of the plurality of nodes based upon an ordering of the unique identifiers associated with each of the plurality of nodes, to uniquely identify each of the plurality of nodes with the index numbers;

determining, by the each computer, a unique index number of the index numbers that is associated with the node by the association;

querying, by the each computer, the other nodes of the plurality of nodes to verify at least a portion of the association; and receiving, from a port, by the each computer, the association as determined by another node of the plurality of nodes; and cause at least one computer of the computers comprising the plurality of nodes of the processing system to:

generate graphical representations, on a graphical user interface on a display of the at least one computer, of the connection data for nodes comprising ports of the processing system based upon connection data from a descriptor that describes the processing system, that was determined by a node of the plurality of nodes of the processing system, and that was received by the node from another node of the plurality of nodes of the processing system, wherein the descriptor is based on an ordering of unique identifiers associated with the plurality of nodes in the processing system;

display, on the graphical user interface on the display, identification information in relation to each node of the plurality of nodes to identify each node of the plurality of nodes to the user based upon the connection data;

generate graphical representations, on the graphical user interface on the display, illustrating cabling between the ports of the nodes of the plurality of nodes, wherein the graphical representations of the cabling interconnect the graphical representations of the plurality of nodes based upon the connection data;

display selectable buttons on the graphical user interface, wherein the selectable buttons represent selectable system configuring options to configure operations of the processing system;

accept a user selection via the selectable buttons to configure a partition of the processing system via the graphical user interface; and configure the partition of the processing system responsive to the user selection.

16. The computer program product of claim 15, further comprising instructions which when executed on the computer cause the computer to configure a basic input output system in response to user input, wherein the user input comprises selection of a graphical representation of a node and single selection from the graphical user interface of a selectable button representing an operation to configure the basic input output system of the node.

17. The computer program product of claim 15, further comprising instructions which when executed on the computer cause the computer to display port identification information.

18. The computer program product of claim 15, further comprising instructions which when executed on the computer cause the computer to display a partition identifier.

19. The computer program product of claim 15, further comprising instructions which when executed on the computer cause the computer to display a primary node.

20. The computer program product of claim 15, further comprising instructions which when executed on the computer cause the computer to detect a malfunctioning communication link and display an indication of the malfunctioning communication link.

* * * * *